(12) United States Patent  (10) Patent No.: US 9,075,975 B2
Bud  (45) Date of Patent: Jul. 7, 2015

(54) ONLINE PSEUDONYM VERIFICATION AND IDENTITY VALIDATION

(71) Applicant: Andrew Bud, London (GB)

(72) Inventor: Andrew Bud, London (GB)

( * ) Notice: Subject to any disclaimer, the term of this patent is extended or adjusted under 35 U.S.C. 154(b) by 0 days.

(21) Appl. No.: 13/769,341

(22) Filed: Feb. 17, 2013

(65) Prior Publication Data

US 2013/0219480 A1    Aug. 22, 2013

Related U.S. Application Data

(60) Provisional application No. 61/601,534, filed on Feb. 21, 2012.

(51) Int. Cl.
*G06F 21/32* (2013.01)
*H04L 29/06* (2006.01)
*G06K 9/00* (2006.01)

(52) U.S. Cl.
CPC .............. *G06F 21/32* (2013.01); *H04L 63/08* (2013.01); *G06K 9/00255* (2013.01)

(58) Field of Classification Search
None
See application file for complete search history.

(56) References Cited

U.S. PATENT DOCUMENTS

| 5,933,502 | A * | 8/1999 | Aucsmith et al. | 713/168 |
|---|---|---|---|---|
| 7,379,114 | B2 * | 5/2008 | Adachi et al. | 348/370 |
| 7,420,656 | B1 * | 9/2008 | Sandusky et al. | 356/5.09 |
| 7,508,960 | B1 | 3/2009 | Bolle et al. | |
| 7,602,942 | B2 * | 10/2009 | Bazakos et al. | 382/103 |
| 7,801,335 | B2 * | 9/2010 | Hanna et al. | 382/117 |
| 7,801,339 | B2 * | 9/2010 | Sidlauskas et al. | 382/124 |
| 8,326,001 | B2 * | 12/2012 | Free | 382/118 |
| 8,477,235 | B2 * | 7/2013 | Mitani et al. | 348/370 |
| 8,548,207 | B2 * | 10/2013 | Langley et al. | 382/115 |
| 8,699,821 | B2 * | 4/2014 | Orr et al. | 382/294 |
| 2006/0279726 | A1 * | 12/2006 | Galambos | 356/71 |

(Continued)

FOREIGN PATENT DOCUMENTS

| EP | 2560123 A1 | 2/2013 |
|---|---|---|
| WO | WO 9843216 | 10/1998 |

OTHER PUBLICATIONS

Shu Zhan, Toru Kurihara, and Shigeru Ando. "Facial Authentication System Based on Real-Time 3D Facial Imaging by Using Correlation Image Sensor". 2006. IEEE Computer Society. Proceedings of the Sixth International Conference on Intelligent Systems Design and Applications (ISDA'06). Retrieved from IEEEXplore.*

(Continued)

*Primary Examiner* — Gilberto Barron, Jr.
*Assistant Examiner* — Wayne An

(57) ABSTRACT

Methods, systems, and computer program products for authenticating an online user. Authentication involves sending a code from a server to a user device equipped with a source of illumination and a camera capable of capturing video imagery of the online user. The user device receives the code, modulates the source of illumination in accordance with the code, and captures video imagery of the user while the source of illumination is being modulated according to the code. The captured video imagery of the online user is sent to the server where it is analyzed to detect evidence of changes in illumination that correspond to the code. If good correspondence is found, the user may be authenticated. Similar methods may be applied to other biometric data. Applications of the authentication include identify validation, pseudonym verification, and distinguishing human from non human access attempts.

30 Claims, 25 Drawing Sheets

(56) References Cited

U.S. PATENT DOCUMENTS

| | | |
|---|---|---|
| 2007/0019862 A1 | 1/2007 | Kakiuchi |
| 2010/0008535 A1 | 1/2010 | Abulafia et al. |
| 2010/0299530 A1 | 11/2010 | Bell |
| 2011/0191840 A1* | 8/2011 | Ortiz et al. ............ 726/7 |
| 2011/0242304 A1 | 10/2011 | Ichige |
| 2012/0120113 A1* | 5/2012 | Hueso ............ 345/672 |
| 2013/0015946 A1* | 1/2013 | Lau et al. ............ 340/5.2 |
| 2013/0269013 A1* | 10/2013 | Parry et al. ............ 726/7 |

OTHER PUBLICATIONS

Maatta, et al., Face spoofing detection from single images using texture and local shape analysis, published in IET Biometrics, 2011.

* cited by examiner

Enrollment

Welcome to the Remote ID Agent.

To create your own personal, secret online Remote Agent ID card, fill in the following fields. The enrolment process takes about 5 minutes.

This information is kept secret, and will not be shared with any other party without your explicit permission each time. The Remote ID Agent Card it creates is yours alone.

First Name
Surname
Country of Residence
First Line of Address
Second Line of Address
City
State/Region
Country of Citizenship Next

FIG. 5

Enrollment

Your mobile phone is a crucial part of the Remote ID Agent service.

Please enter your mobile phone number. This should be for the device you have with you most frequently

| +44 | 7777 123456 |

We will now send you a text message containing a PIN number. Please type the PIN number here and press Go

[        ] [ Go ]

What kind of phone do you have in your hand?

[ Make ] [ Model ] [ Go ]

We are now sending you a link enabling you to install the Remote ID Agent app on your handset. When it arrives, please click the link and follow the instructions.

*FIG. 6*

Enrollment

To ensure that your Remote ID Agent service is secure, an app now needs to be installed. To proceed click here Thank you for installing the Remote ID Agent Secure Verifier The Remote ID Agent has detected that you have a webcam installed. We will use this to simplify and speed up the enrolment process Please look at the webcam now

[ Next ]

FIG. 7

Enrollment

To ensure that your Remote ID Agent service is secure, an app now needs to be installed. To proceed click here Thank you for installing the Remote ID Agent Secure Verifier The Remote ID Agent has detected that you have a webcam installed. We will use this to simplify and speed up the enrolment process
To enrol, you will need at hand as many as possible of the following documents:

- Passport
- National Identity card
- Driving Licence with photo
- Social Security card
- Bank statement
- Utility bill
- Credit card[s]
- Debit card[s]

The information from all these documents will be saved electronically for your personal use and will be kept secret. For more details on our security policy and references visit here

[ Next ]

*FIG. 8*

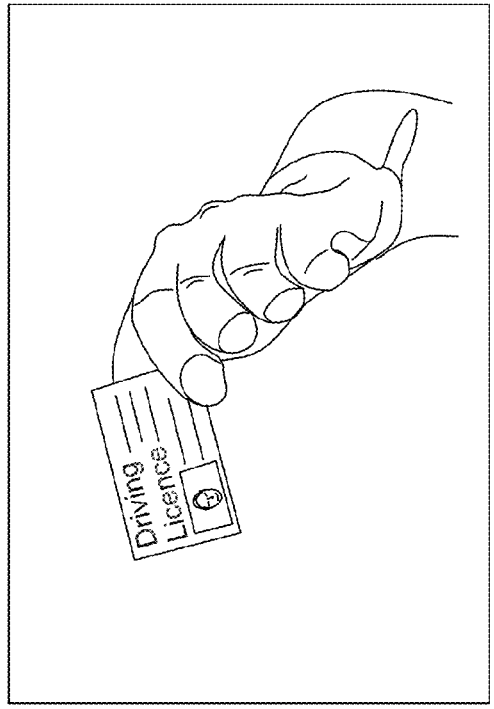
FIG. 9

Enrollment

You have enrolled and registered your:

- ☑ Name, address and mobile phone details
- ☒ Passport
- ☒ National Identity card
- ☑ Driving Licence with photo
- ☒ Social Security card
- ☒ Bank statement
- ☒ Utility bill
- ☒ Credit card[s]
- ☒ Debit card[s]

You can add further credentials at any time by returning to remote-id-agent.com/creds Next you set up your proof of ownership of your Remote ID Agent Card

[ Next ]

*FIG. 10*

Enrollment

Thank you. We have taken a good photo of your face, which will be used whenever you use the Remote ID Agent to verify you If you have a Facebook account, we can use that to make you more secure. We will not share any information with Facebook, or tamper with your account in any way.

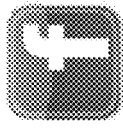

Log in to Facebook here

Sometimes there may not be a camera available. In that case, we will enable you to use your Remote ID Agent card by a number of different methods Next

FIG. 12

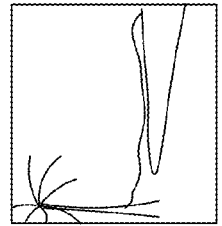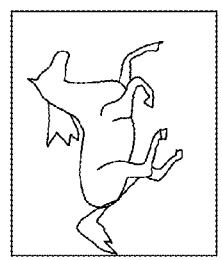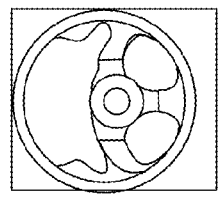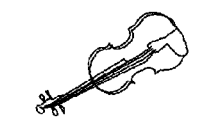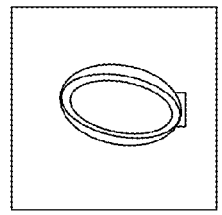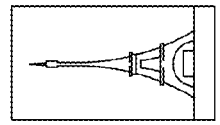
FIG. 13

Welcome to Our Online Payment Area

Quick Links

● South Hampstead
  High School - Home Page

○ School Trips
○ Dinner Money
○ Terms and Conditions
○ Help

Please Click on the Sections Below to Browse for Items
the Can be Paid For Online Pay School Trip >
View all your
payments made and
payments to make.

School Meals >
Pay for school
meals here.

Log In
Enter your username or email

● Use my Agent
○ Yes I have a password
○ No it's been forgotten
Enter your password

[Log In]

Prefer to Avoid Passwords?
Register Now with iProov

We accept major Credit Cards

*FIG. 15*

Remote ID Agent is verifying you for Wisepay

Total Peace of Mind – without passwords

Please watch this panel until it stops flashing

Verified

*FIG. 16*

Welcome to Our Online Payment Area

Quick Links

● South Hampstead High School - Home Page

○ School Trips
○ Dinner Money
○ Terms and Conditions
○ Help

Please Click on the Sections Below to Browse for Items that Can be Paid For Online Pay School Trip >
View all your payments made and payments to make.

School Meals >
Pay for school meals here.

John Smith
You are now logged in

FIG. 17

Sorry, the Remote ID Agent doesn't recognise the login name you've used

If you are already enrolled with the Remote ID Agent, add this login name for WisePay to your profile now:

[ Add a login name ]

If you have never enrolled with the Remote ID Agent, you could start to enjoy all the free benefits now

[ Find out more ]

You can return to WisePay and log in using your password instead

[ Return to WisePay ]

*FIG. 18*

Remote ID Agent – your personal ID for the Internet

Secure
    Private
    Simple

Your Remote ID Agent ID is yours and no one else's.
Your Remote ID Agent ID is as rich and as complete as you make it
No one else will ever see it
Yet it will unlock instant access to secure services all over the Internet

[ Enroll now ]

No more Passwords
Secure yourself against Identity Theft
Faster, simpler access to services Learn more at remote-id-agent.co/about

*FIG. 19*

Welcome John Smith!
Your logins registered with the Remote ID Agent are:

| Email/Name | Registered sites | Status |
|---|---|---|
| John:@btinternet.com | all | confirmed |
| LSmith@hotmail.com | all | confirmed |
| Johns37@gmail.com | all | Pending |
| LSmith1 | BankofScotland.co.uk | Active |
| | Nationwide.co.uk | Active |
| | Santander.co.uk | Active |
| | Vodafone.co.uk | Active |
| Johninfinchley | Axminster.co.uk | Active |

Here you can:

You can now:

Get a new login email from the Remote ID Agent

Register a new login email

Register a login name

Return to Wisepay & login using password

FIG. 21

Get a new login email from Agent

Here you can get a special Remote ID Agent email address to use all over the web Choose a name:

| JohnSmith | @remote-id-agent.org

This name is available

All mails sent to this address will be forwarded to

| John@btinternet.com

| Confirm |

Register a new login email

Here you can register an email of your choice to use all over the web

John@ieee.org

Confirm

After you press the Confirm button, a verification email will be sent to you at this new address.

Please click the link it contains to complete the registration process.

*FIG. 23*

Register a new login name

Here you can register a login name you intend to use to access a specific site

Login name:

| transatlantic |

To be used when logging onto:

| Wisepay.co.uk |

Note: you can only do this when you've been referred to us by the site

[ Confirm ]

*FIG. 24*

ONLINE PSEUDONYM VERIFICATION AND IDENTITY VALIDATION

CROSS REFERENCE TO RELATED APPLICATION

This application claims right of priority to and the benefit under 35 U.S.C. §119(e) of provisional patent application Ser. No. 61/601,534, filed Feb. 21, 2012, which is incorporated herein by reference.

BACKGROUND

Services of all kinds are increasingly being delivered online via the internet. Many of these services involve transactions which are either financial or involve personal information. If access to these services is compromised, wrongdoers may steal money or personal information from a consumer of such services, causing harm to the consumer and also to the service provider. Such service providers may include banks, merchants, medical services and Government benefits agencies.

To prevent unauthorized access to these services, service providers typically require the customer to identify themselves using some sort of pseudonym, and to corroborate this with a password.

In recent years, cyber criminals have devised ways to eavesdrop the entry of such credentials and to use them for unauthorized access. A typical means of eavesdropping is to fool the customer into opening a file which secretly installs a keystroke logger and captures the characters typed by the customer when entering their credentials. Another method is to redirect the customer to a rogue site resembling that of the service provider in every respect, inducing the customer to enter their credentials which are thus directly captured by the criminal.

In order to defend against such attacks, service providers have responded by a number of means, including: asking the customer to enter individual characters from their passwords, perhaps using dropdown menus, in order to evade key loggers; and requiring verification from a separate device known to be owned by the customer, such as a key-generating token, a mobile phone, or a password generator enabled by a chip-and-pin card. In addition, service providers are aware that passwords can easily be guessed or compromised, and are demanding the use of more complex passwords.

However consumers have a limited ability or desire to create, manage or remember a proliferation of complex passwords, and many consumers therefore use the same password for most or all of their on-line presences. The result is that if this single password—however complex—is compromised in the context of access to one service provider, then the consumer's entire cyber life is open to the criminal.

The defenses described above all have the effect of creating greater complexity in the user experience, either requiring more data to remember, requiring more steps in the log-on procedure, or the possession, availability and simultaneous use of a second device. Such complexity is known to reduce the customer's proclivity to engage in or complete transactions.

Many consumers are unwilling to use a single identity for all their online transactions, as they believe this makes their cyber life easier for third parties to track in violation of their privacy. They therefore prefer to undertake their activities behind a variety of pseudonyms. When solving the problem of credentials, it is therefore important to allow the consumer to choose their own pseudonym, and to concentrate on the challenge of verification.

Many biometric means have been used to verify personal identity. Many of these solutions, such as fingerprint recognition, require a special hardware sensor device to be present in the user device. This is a barrier to wide take-up. Of all biometric means, there are some which can work by making use of sensors which are already widely available on user devices such as computers, tablets or mobile phones. These are: the visual recognition of some feature of the user; exploiting a camera; and the audio recognition of the user's voice, exploiting a microphone.

Facial recognition has the advantage that, alone amongst biometric recognition methods, it does not require the user to do anything active at all. This makes it a much simpler experience. The use of face recognition as a means to save users the trouble of entering passwords is already established art, and is standard on the latest release of the Android operating system. However these methods—together with other similar biometric means such as fingerprint recognition—are based on the detection and identification of the biometric characteristic by software on the user's device. Thus validation is completed on the user's device. This validation then unlocks the use of a password (stored on the device) for submission to the web site of a remote service provider. Such a method is vulnerable to the compromise of the user's device. If malicious software is introduced onto the user's device, it may intercept the textual password as it sent to the service provider for future criminal reuse. Furthermore, such methods do not work if the service provider's validation process requires a more complex interaction than the simple submission of a password.

The current facial recognition solutions on the Android system have proven vulnerable to spoofing attacks using photographs or video replays. Various attempts to address this have been made by introducing "liveness" tests by making a user perform certain gestures, which reduce the user convenience and hence user acceptance.

There is therefore a need for methods of authenticating an online user's face that are less vulnerable to compromise.

SUMMARY

In general, the methods, systems, and computer program products described herein enable a remote agent to perform verification of online user pseudonyms, and to validate user identities online and in real time. Pseudonym verification and identity validation is preceded by online enrollment of the online user. The agent may provide a service to one or more online service providers, and may be implemented in the cloud. The described embodiments feature the use of a biometric marker such as facial imagery.

In general, in one aspect, a method for online identity registration includes: receiving over a network a user name; issuing over the network to a client device of an online user a request that the client device capture biometric data of the online user; receiving over the network the biometric data of the online user; and storing the biometric data in association with the user name.

Various embodiments include one or more of the following features. The user name is a pseudonym. The user name corresponds to a valid identity of the user. The user name is received from an online service provider. Receiving over the network a second user name associated with the biometric data and storing the second user name in association with the biometric data and the first-mentioned user name. The second user name is received from an online service provider. The client device includes a camera, and the request that the client device capture biometric data of the online user includes a request that the camera capture an image of the online user. The request includes transmitting data to the client device for real-time display on a display of the client device. Display of the data causes a change in the captured image. The data includes an image, and the change includes a change associated with an eye of the user. The data defines a region of the display, and the change is caused by reflection by the user of visible light or infrared emitted by the region. Capture of the biometric data is temporally synchronized with the transmitted data. Using the captured image to detect a blinking of an eye of the user. Using the captured image to determine a kinematic property of an eye of the user. Using the captured image to determine a dental characteristic of the user. The client device includes a camera, and the request that the client device capture biometric data of the online user includes a request that the camera capture a sequence of images of the online user. The client device is a computer system comprising an input and a digital camera in data communication with the input, wherein the request that the client device capture biometric data includes a request that the camera capture an image of the online user. The client device is a thin client, and may be a portable device such as a smartphone, a tablet, and a laptop computer. The user name is a real name and: receiving over the network an image of an original identity document of the online user; using the image of the original identity document to perform a validation that the user name corresponds to an identity associated with the original identity document; and storing information indicative of the validation. The online user uses a client device connected to the network and the image of the original identity document of the online user is captured by the client device. The image of the original identity document includes a facial image, and validation involves comparing the received facial image of the online user with the image of the original identity document. The original identity document is a passport, national identity card, driving license, Social Security card, credit card, or debit card. The user name is a real name and: issuing a request over the network to a database that includes identity information; receiving identity information from the database; using the image of the original identity document to perform a validation that the user name corresponds to an identity associated with the original identity document; and storing information indicative of the validation.

In general, in another aspect, a method of verifying that a login name belongs to an online user includes: receiving the login name over a network; issuing over the network to a client device of the online user a request that the client device capture biometric data of the online user; receiving biometric data over the network; comparing the received biometric data with stored data associated with the login name to determine a quality of match between the received biometric data and the stored data associated with the login name; and if the quality of match exceeds a threshold quality of match, issuing an indication of verification that the login name belongs to the online user.

Various embodiments include one or more of the following features. The indication of verification is transmitted over the network to an online service provider. The indication of verification includes a degree of confidence that the login name belongs to the online user, wherein the degree of confidence is based on based on the quality of match between the received biometric data and the stored biometric data associated with the login name. The stored data associated with the login name includes stored biometric data, and the comparing step includes comparing biometric characteristics of the received biometric data with corresponding biometric characteristics of the stored biometric data. The stored data associated with the login name includes information known by the user, and the comparing step includes extracting information from the received biometric data and comparing the extracted information with the stored information known by the user. The information known by the user is an image recognized by the user, and transmitting over the network to the client device of the online user the image recognized by the user for display at a specified position on a display of the client device of the online user, wherein the extracted information includes a pointing direction of an eye of the online user indicative of the user looking at the display of the image recognized by the user at the specified location on the display of the client device of the online user.

In general in another aspect, a method of authenticating an online user involves: sending information from a server to a user device, wherein the user device includes: a source of illumination; a camera capable of capturing video imagery of the online user; and wherein the user device is capable of: receiving the information; modulating the source of illumination based on the received information; and transmitting captured video imagery of the online user to the server; receiving at the server captured video imagery of the online user transmitted by the user device, wherein the video imagery is captured by the camera while the source of illumination is being modulated according to the control signal; analyzing the received video imagery to detect evidence of changes in illumination that correspond to the information; and generating an authentication response based on the analyzing of the received video imagery.

Various embodiments include one or more of the following features. The user device includes a main processor and a graphics processor, and a screen of the user device is controlled by the graphics processor. Displaying on a screen of the user device a sequence of blocks of uniform color having a size that is large enough to illuminate a user's face and produce a measurable reflection from their skin. Displaying the blocks at a high enough rate to ensure that in an attempt at impersonation, the computing power available locally on the user device is insufficient to synthesize a suitably tinged image from a recorded or synthesized base image. Analyzing a spatial distribution of color reflectivity from the face of a user to determine if the user is present. Generating a time-based pattern of illumination on a user's face, and extracting from captured video of the user's face a code used to control the pattern of illumination. Comparing the extracted code with the code corresponding to the transmitted control signal, and if the comparison is substantially perfect, generating an authentication signal. If the video is captured in natural light and as a result of lower proportionate change in imposed illumination a frame error rate is increased, analyzing the captured video to determine a probability that the code used was the same as the code corresponding to the transmitted control signal, and if the probability exceeds a threshold probability, generating an authentication signal. Forcing the camera in the user device into a condition of over-exposure. Achieving the over-exposure by using a spot focus from the camera on a region at or near the center of the face of the user to establish an exposure tailored to the face from which an adjustment is calculated and applied. If the user device includes one or more gyroscopes and/or one or more accelerometers, using gyroscope and accelerometer data to determine when the user device has been rotated to a position suitable for capturing imagery of the face of the user with a rear-facing camera. Authenticating that a user is a human being as opposed to an automated program, including but not limited to a bot or crawler, that is seeking to gain online access. The automated program is seeking to gain online access by responding to a form of Turing test challenge.

BRIEF DESCRIPTION OF THE DRAWINGS

FIG. 5 is an illustration of a user screen for starting enrollment with a remote ID agent.

FIG. 6 is an illustration of a user screen for registering a mobile phone number during enrollment with a remote ID agent.

FIG. 7 is an illustration of a user screen for installing a remote ID agent app on a user client device and using a camera associated with the device during enrollment with a remote ID agent.

FIG. 8 is an illustration of a user screen for installing a remote ID agent app on a user client device and using a camera associated with the device together with identification documents during enrollment with a remote ID agent.

FIG. 9 is an illustration of a user screen for registering an original identity document using a camera associated with the use client device during enrollment with a remote ID agent.

FIG. 10 is an illustration of a user screen for confirming the original identity documents that have been registered during enrollment with a remote ID agent.

FIG. 12 is an illustration of a user screen for completing enrollment with a remote ID agent.

FIG. 13 is an illustration of a user screen for registering non-biometric data during enrollment with a remote ID agent.

FIG. 15 is an illustration of a user screen in which a merchant offers the user the option to login with a remote agent.

FIG. 16 is an illustration of a user screen for user identification by a remote agent.

FIG. 17 is an illustration of a user screen shot after successful login via the remote agent for interaction with a merchant.

FIG. 18 is an illustration of a user screen shown to the user by the agent when a user pseudonym is not recognized.

FIG. 19 is an illustration of a user screen of an invitation to enroll with the agent.

FIG. 21 is an illustration of a user screen for selection of a new pseudonym during a process for adding a pseudonym for registration with the agent.

FIG. 23 is an illustration of a user screen for selection of a user-selected pseudonym during a process for adding a pseudonym for registration with the agent.

FIG. 24 is an illustration of a user screen for selection of a site-specific user-selected pseudonym during a process for adding a pseudonym for registration with the agent.

DETAILED DESCRIPTION

Systems and methods for remote, real-time pseudonym verification and identity validation of online users are described. The techniques do not require recollection of any prior knowledge, protect against at least one of eavesdropping and malicious replication and compromise of the device by third parties. The systems and methods feature an independent, network-based agent (referred to below as the Agent) that provides reliable pseudonym verification and identity validation for service providers. The Agent makes use of readily captured biometric data.

In the approach described herein, the camera and the screen of a user's device are remotely controlled at the same time. The camera video signal is then transmitted from the device to the Agent. As it is difficult to run separate processes on processors found in devices such as smartphones while at the same time maintaining signal synchronization, the process for controlling the screen is moved from a main processor of the device to a graphic controller. The video may be streamed using the rtmp protocol, which provides better and faster timing accuracy than the conventional http protocol.

Figure 1:
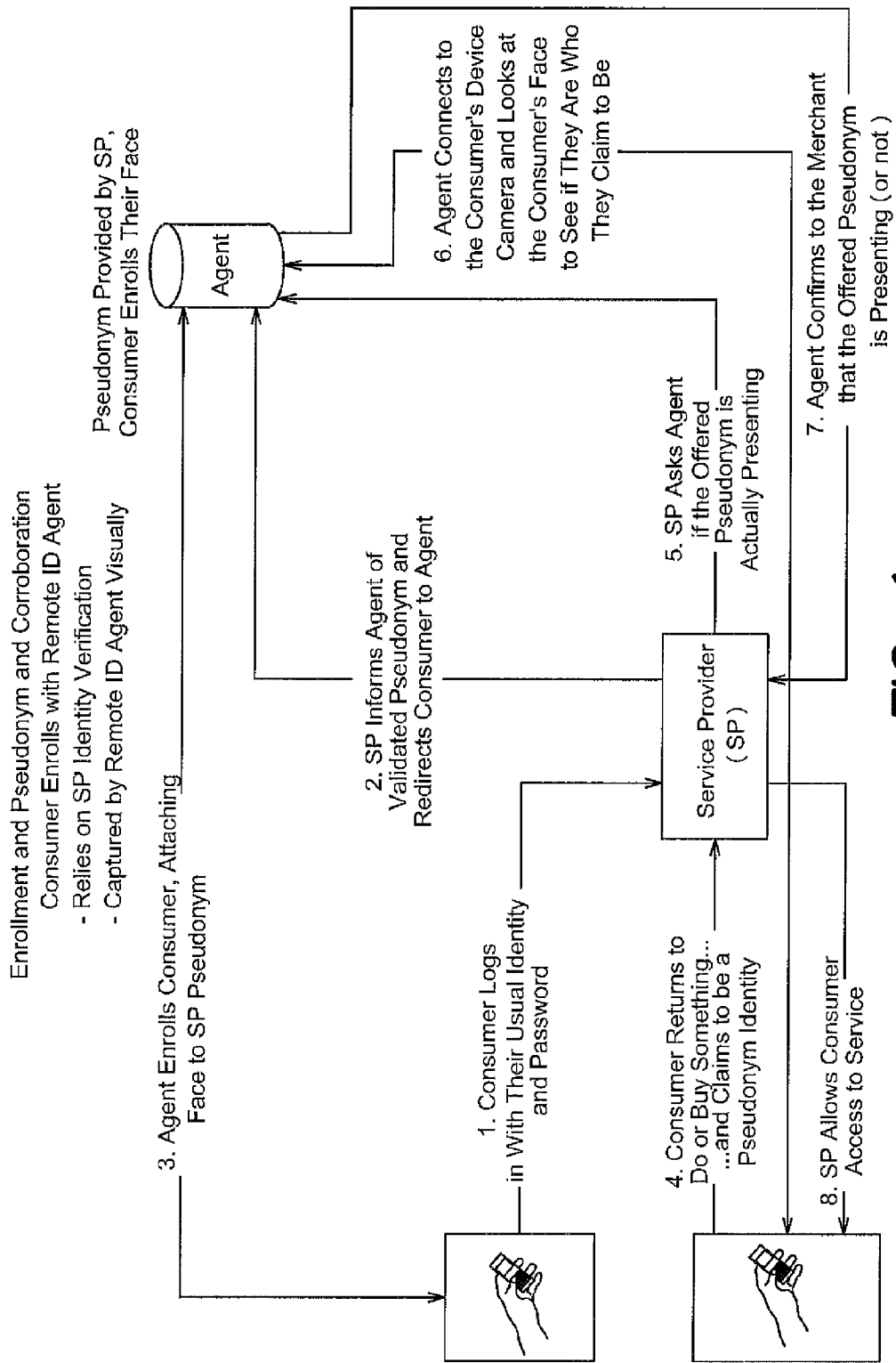
FIG. 1 is a high-level flow diagram of pseudonym verification by a remote agent.
Figure 2:
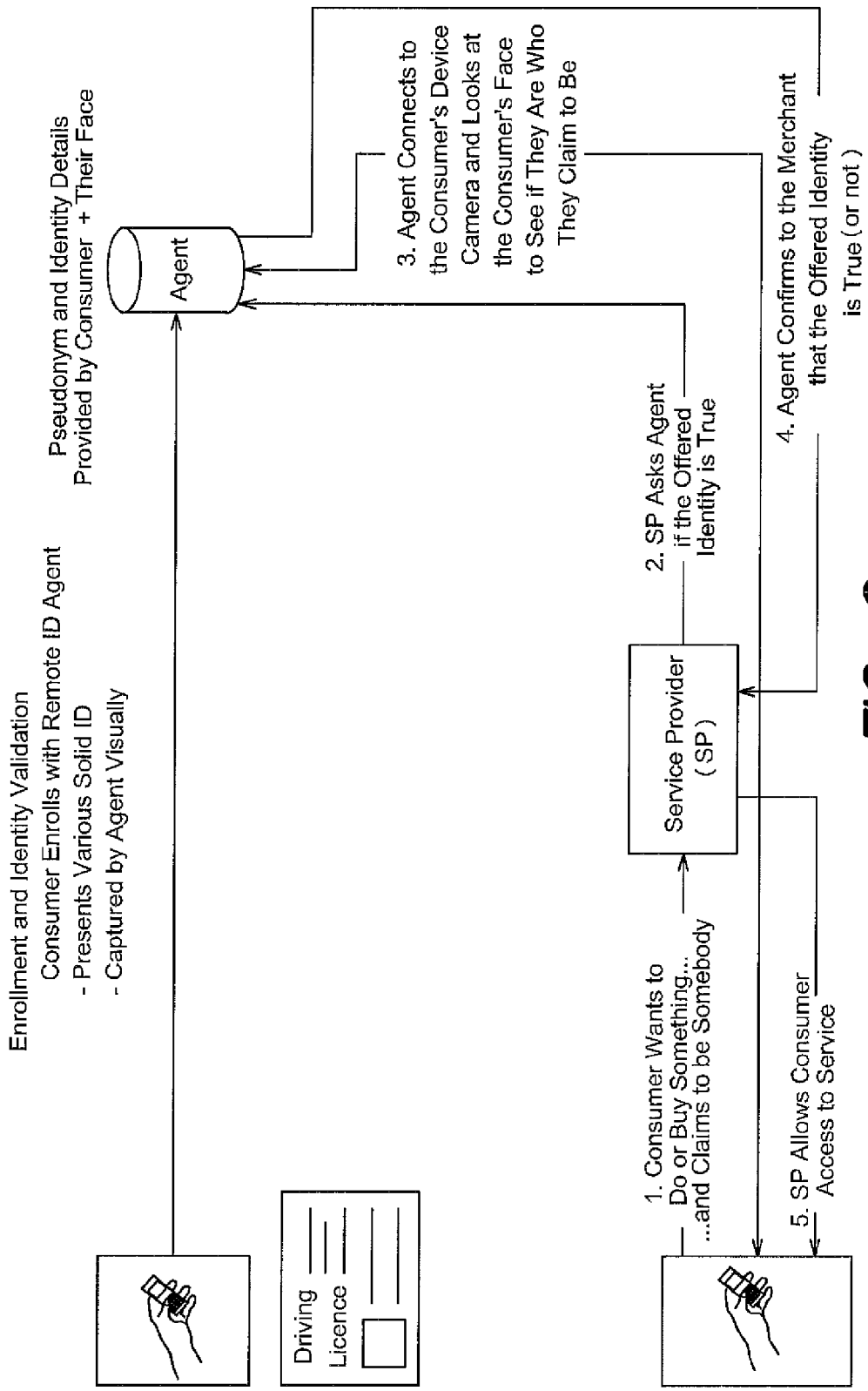
FIG. 2 is a high-level flow diagram of identity validation by a remote agent.

FIG. 1 is a high-level flow diagram illustrating the steps involved in enrolling a user's pseudonym by tying it to biometric data, and verifying the pseudonym when presented by the user during a subsequent interaction with a merchant. In an optional extra phase the pseudonym is tied to a real person of known and confirmed personal identity. FIG. 2 is a high-level flow diagram illustrating the steps involved in enrollment of a user that includes registration of the user's real identity, and validating the user's identity when presented to a merchant. In the identity validation phase, the user may elect to use a pseudonym that is the user's actual name.

The Agent is in data communication with the user's device over a wide area network, such as the Internet. Located remotely from the user device, the functioning of the Agent and its relationship to the service provider is secure against compromise of the user's device. Biometric data is sent to the agent over the network. Examples of biometric data include but are not limited to: visual information derived for example from facial analysis, skin color or tone, blink dynamics; chemical analysis for example, from a breathalyzer, DNA sample; and other sources such as tonal analysis of some aspect of speech. The system is designed to resist compromise involving the recording or synthesis, and subsequent playback of a bogus user image or video. It provides a means of distinguishing between authentic visual information received from the user and recorded or otherwise falsified information.

As a third party, the Agent is in a position to provide biometric-based user verification and identity validation to more than one service provider. The user may use multiple pseudonyms which, at the consumer's discretion, may be provided by the Agent. The consumer may also devise one or more personal pseudonyms and may inform the Agent of its use and the context in which it is used by enrolling the pseudonyms. The task of the Agent is not principally to issue pseudonyms, but to confirm by biometric means that a user providing a given pseudonym to gain access to a service is the same person who initially registered their biometric data under that pseudonym with the agent, and is not an impersonator.

In addition, multiple real persons with respective identities may be registered to use the same single pseudonym. For example, a first user may share her password with one or more other users so that other users are able to log into the first user's account and share the access rights of a single pseudonym. A group pseudonym is linked to a list of faces, any one of which may gain access. The addition of new faces to a group pseudonym would be under the control of a group pseudonym administrator.

As used herein, the term enrollment refers to the association and recording, (i.e., registration) with an agent of the biometric data of a user and at least one pseudonym for validating the owner of the pseudonym who is registering their biometric data.

Figure 3:
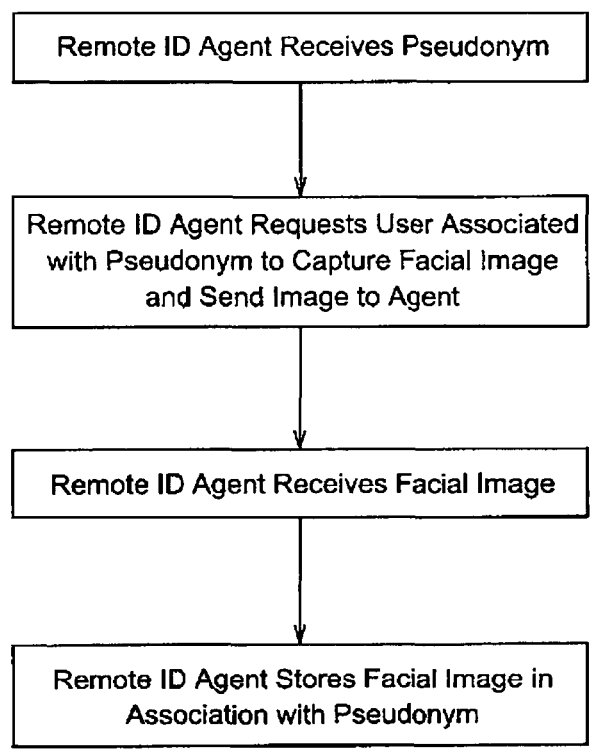
FIG. 3 is a high-level flow diagram showing steps performed by a remote agent to register a user's pseudonym during enrollment.

A high level flow diagram of the steps involved in the enrollment of a user's pseudonym is shown in FIG. 3. In one scenario, prior to the first step in FIG. 3, the user has already been authenticated by a service provider (SP) using the SP's own means, and is then referred to the Agent site. This referral from the SP includes the pseudonym by which the user is known to the SP. The Agent then trusts that the user currently referred by the SP is indeed the owner of that pseudonym when used to access that SP, and then requests and captures the facial or other biometric data of the user (see below).

In a second scenario, prior to the first step in FIG. 3, the user either has not been authenticated by a SP, or has been authenticated by a SP but to a degree insufficient to guarantee the global authenticity of a pseudonym that may be used with multiple SPs. In this case, the Agent receives the pseudonym and may then undertake an independent enrollment, involving the capture of biometric data, and optionally associating such data with a pseudonym that the Agent itself issues. Such a pseudonym is globally unique and inherently attributable to the Agent, so that SPs may immediately identify it as requiring verification by the Agent. A variant of this scenario occurs when the user enrolls with the Agent under a pre-existing pseudonym or with the user's real name.

Figure 4:
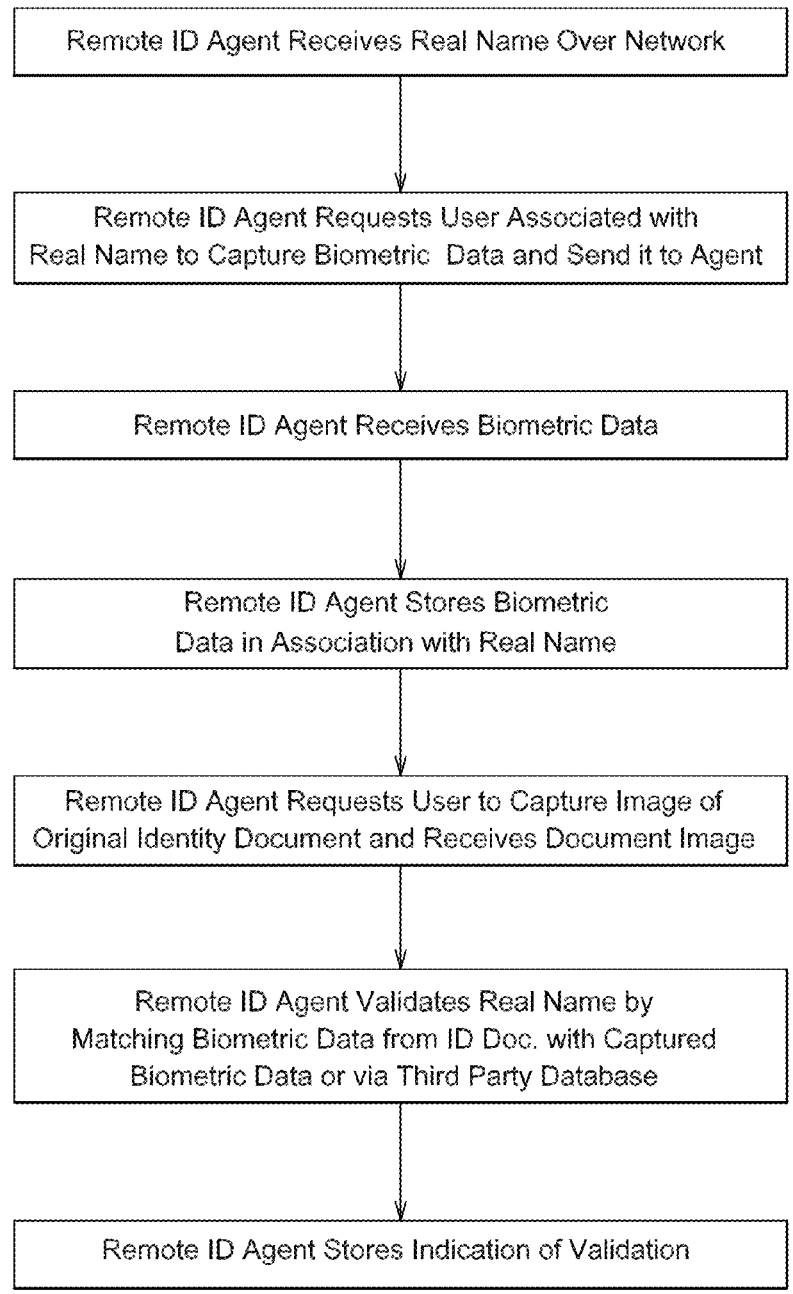
FIG. 4 is a high-level flow diagram showing steps performed by a remote agent to register and validate a user's real identity during enrollment.

The described methods and systems also enable independent validation of real identity, so that the biometric data may confirm the actual identity of the individual, not just their pseudonym. To this end, enrollment of real identity (see FIG. 4) may include the visual capture of original identity documents, such as passport, national identity card, driving license, Social Security card, and credit or debit card. The process may also include cross-checks to other databases such as driving license issuers, national passport or identity card issuers, credit scoring databases, lists of lost and stolen documents, alerts of identity theft, electoral rolls, online telephone directories, schedules of company directors, register of vehicles, social networking sites, online photograph albums, and search engine results linking names to other personal details. This helps ensure that the person presenting their biometric data is not impersonating the real-world identity of another individual. Once enrollment is successfully accomplished, the Agent is in a position to confirm the true identity of the individual to service providers to whom such a claim of identity is presented with a greater degree of confidence than that achievable by the service provider alone.

Figure 11:
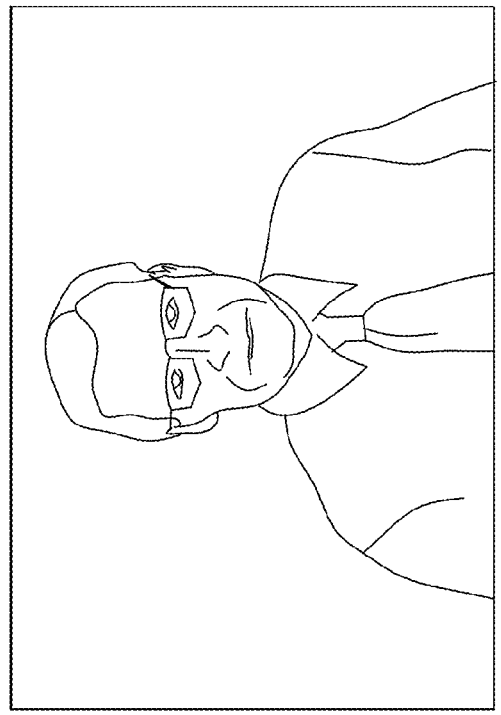
FIG. 11 is an illustration of a user screen for capturing a photograph of the user using a camera associated with the use client device during enrollment with a remote ID agent.

An illustrative flow of interaction between the Agent and the user during the identity enrollment process is now described. The Agent starts by capturing basic user information (FIG. 5). The user's mobile phone number is then entered, verified with a PIN, and an app is sent to the phone for the user to install (FIG. 6). This app is used for subsequent pseudonym or real name verification using the phone. If the phone has a camera, the user is invited to look at the phone's camera during installation of the app. (FIG. 7). Note, any available camera that is in data communication with the client device being used for enrollment may be used for image capture, such as a webcam connected to a personal computer, or an integral camera in a tablet. If the enrollment of the user's identity is to involve original identification documents, the user is invited to gather these documents (FIG. 8) and present them in turn to the camera for registration by the Agent (FIG. 9). A summary screen lists the items that have been registered as part of the enrollment (FIG. 10). The Agent maintains the association between the registered items and the user's real identity and all the user's registered pseudonyms. The Agent also captures an image of the user's face, and ensures that the image being captured is of sufficient quality to be effective in future validation (FIG. 11). Relevant parameters may include size (resolution), and angle (reasonably head-on shot, no more than 10-20 degrees away from face-on angle), and lighting (sufficient contrast and reasonably balanced color). The Agent also invites the user to enter a social media account which may provide an additional basis for identity validation (FIG. 12). This is based on confirming that the biometric data being presented during enrollment resembles that published on the social media site, either on the user's own account, or tagged with the user's name by other people. The system is tolerant to failure of this source of data since some users do not register on social media sites using their real name. The user is also invited to add non-biometric data to the identification profile (FIG. 13).

Figure 14:
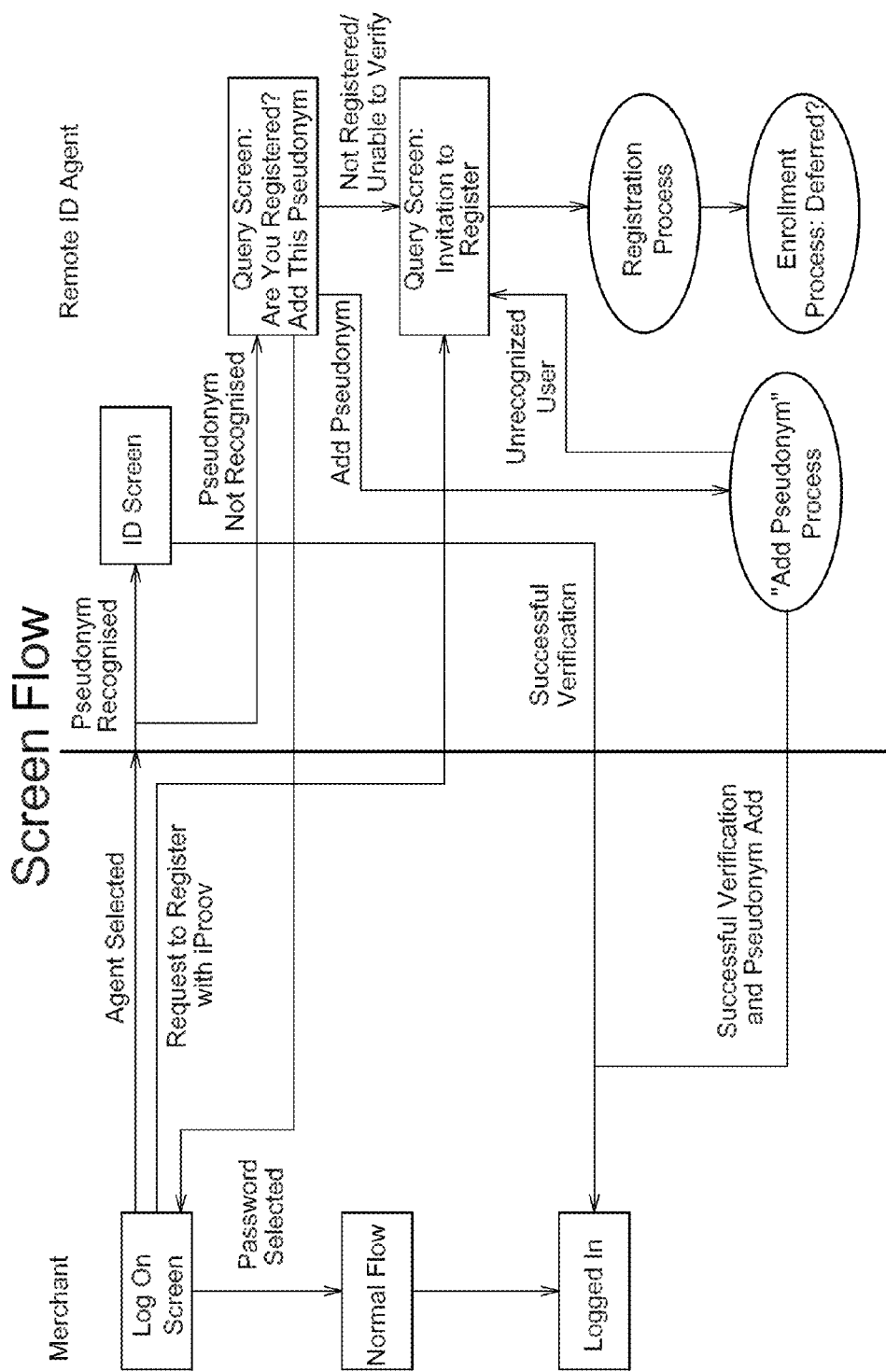
FIG. 14 is a flow diagram showing sequencing of screens displayed to a user during pseudonym verification.

An exemplary identity validation phase is now described with reference to an Agent that uses biometric data that includes facial imagery. FIG. 14 shows an example of a flow of screens presented to the user during pseudonym verification. This is further illustrated using a specific example of a merchant, in this case, South Hampstead High School. The flow starts with the merchant's log-on screen (FIG. 15), which, upon election by the user, refers the user to the Agent (FIG. 16). The user is made aware of the fact that the merchant directs the user to a second entity (WISEPAY®) that handles the payment, registration, and login. Thus, the "merchant" functions appear to the user as being fulfilled by two different entities. In other situations, the user is only made aware of a single entity, which is usually the entity delivering the goods or services, even if the ecommerce transactions are actually fulfilled by another entity such as a Payment Services Provider such as CYBERSOURCE®. In some instances, it is in fact the same entity that also processes the e-commerce transactions, such as, for example, in the case of AMAZON.COM®.

Figure 20:
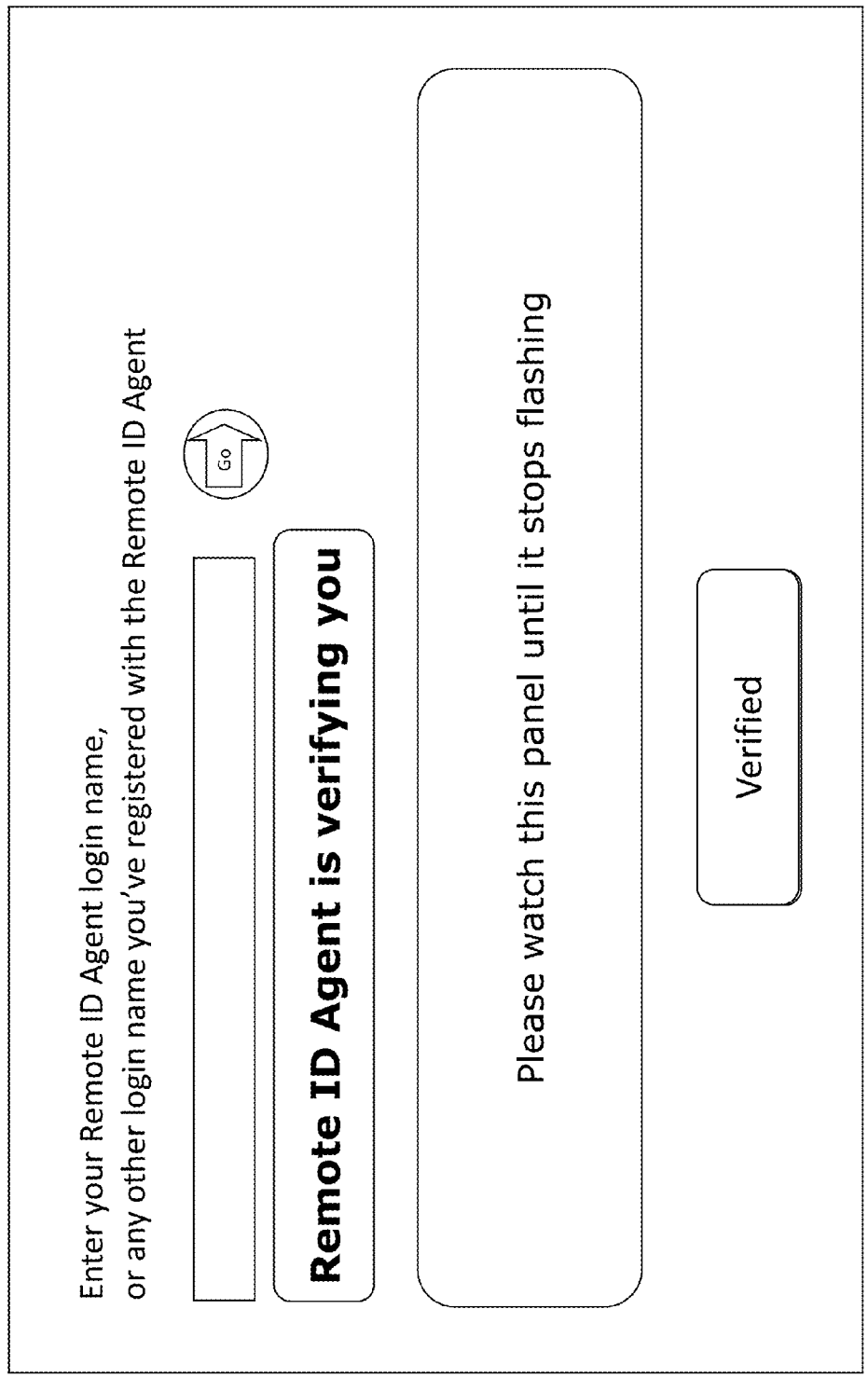
FIG. 20 is an illustration of a user screen for pseudonym verification during a process for adding a pseudonym for registration with the agent.
Figure 22:
FIG. 22 is an illustration of a user screen for selection of an agent-supplied pseudonym during a process for adding a pseudonym for registration with the agent.

The Agent proceeds to verify the pseudonym presented by the user to the merchant and/or the second entity. This involves capturing biometric data of the user, and comparing the captured biometric data to previously captured and stored biometric data associated with the presented pseudonym. As discussed above, the stored biometric data may include data captured during the enrollment phase as well as data culled from other sources. The captured biometric data may be a facial image of the user, or may be other forms of biometric data, such as those described below. The capture of the biometric data may involve techniques for preventing fraud, such as spoofing attacks, as discussed below. If the Agent is able to verify the pseudonym by comparing the biometric data presented by the user requesting login and at least some of the biometric data stored by the Agent, control is returned to the merchant with an indication of the outcome of the verification, either in the form of a pass/fail outcome, or with a parameter indicating the level of confidence in the verification that has been performed. The merchant may then allow the user to proceed with normal flow and login (FIG. 17). If the pseudonym is not recognized, the user is invited to register the pseudonym (FIG. 18), or, if the user is not yet registered with the Agent, to enroll as a new user (FIG. 19). In order to enable a user to add a pseudonym, the user is invited to log in with a user name that is already registered with the Agent (FIG. 20), and is shown a summary of the IDs that have already been registered with the Agent (FIG. 21). The user may elect to register a new pseudonym supplied by the Agent (FIG. 22), an existing email login (FIG. 23), or a new login name specific to a particular site (FIG. 24).

In some scenarios, identity validation is required in addition to pseudonym verification. During the identity validation phase, the Agent validates the personal identity of a user by comparing the face presented to the Agent by the user at enrollment with one or more of the photograph of the person on their passport, identity card, or driving license as seen by a camera pointing at the user while validation is being performed. The presented face may also be compared to an online database of photographs held by the issuers of passports, identity cards or driving licenses to compare the presented face with that held on such databases. Social networks and/or online photograph albums may also be interrogated to find references to persons of the same name, and the images tagged with such a name may be compared with that presented to the camera. The identity documents presented for enrollment and/or the name and address enrolled may be compared with databases of lost and stolen credit cards and/or lost and stolen identity documents, to ascertain if the documents presented at enrollment have a forgery alert linked to them, or are registered as stolen. The name and address enrolled may be compared with databases of identity theft, credit rating or lost and stolen credit cards or lost and stolen identity documents to determine if the identity being presented by the user has been compromised. The name and address enrolled may be cross-checked against the electoral rolls, telephone directory, register of directors or register of vehicles to determine if the combination is consistent with that presented.

The identity validation and pseudonym verification techniques are collectively referred to herein as authentication techniques. These involve the use of some or all of: captured real-time data, including biometric data; previously captured secret data; and other established authentication means. Captured real-time data is sent to the Agent, which performs authentication by analyzing the captured data, and where applicable, comparing it to stored data, including biometric data, pertaining to the user. In the case of communication methods, the Agent uses biometric parameters extracted from the real-time data to discover possession of secret knowledge by the individual and its communication to the Agent by biometric methods. Biometric methods are exemplified by image-based methods (including still images and/or video) and chemical methods as described below.

The purpose of these techniques is to defend against a range of spoofing attacks so as to distinguish a genuine real-time presence of the person corresponding to the proffered pseudonym or real identity from all other situations. A significant category of such attacks are recordings of the true person's biometric data made sometime in the past and presented to the Agent at the time of authentication. In the case of facial image recognition, authentication must also preclude the possibility of falsely authenticating a photograph, a three-dimensional model such as a statue with natural coloration, or video replay either presented to the camera or injected directly into the user client device.

The reflected illumination method involves controlling a source of illumination falling on the face of the user by pushing commands over the Internet to the user's mobile device. The sources of illumination include the illuminator or flash associated with a rear-facing camera in the mobile device, and the device display screen itself. Although the sources of illumination emit primarily in the visible light range, emissions in infrared may also be used, either from the infrared end of a continuous spectrum white light illuminator, or from a specifically infrared source. Since the user is in proximity to the device and facing it, this has the effect of changing the character of light reflected off the user's face that is then captured by a still or video camera on the user's mobile device. The captured imagery may be stored locally, and transmitted when complete, or streamed during the capture process. The imagery may be transmitted as a file, as one or more transport streams, or as a series of compressed or uncompressed individual images.

The pattern of remotely controlled illumination is modulated to represent a code that is changed each time user authentication is performed. The code is changed each time an authentication takes place. The code may be represented in binary form, and is preferably at least 8 bits long. For example, the code may be ten bits long bookended by 1's to provide a 12-bit code.

Each bit of the code may cause the illumination source to turn on or off completely, modulate its brightness, change its color, or change the duration of the periods of light and dark. Each of these serves to time stamp the face, thereby thwarting replay attacks.

Figure 25:
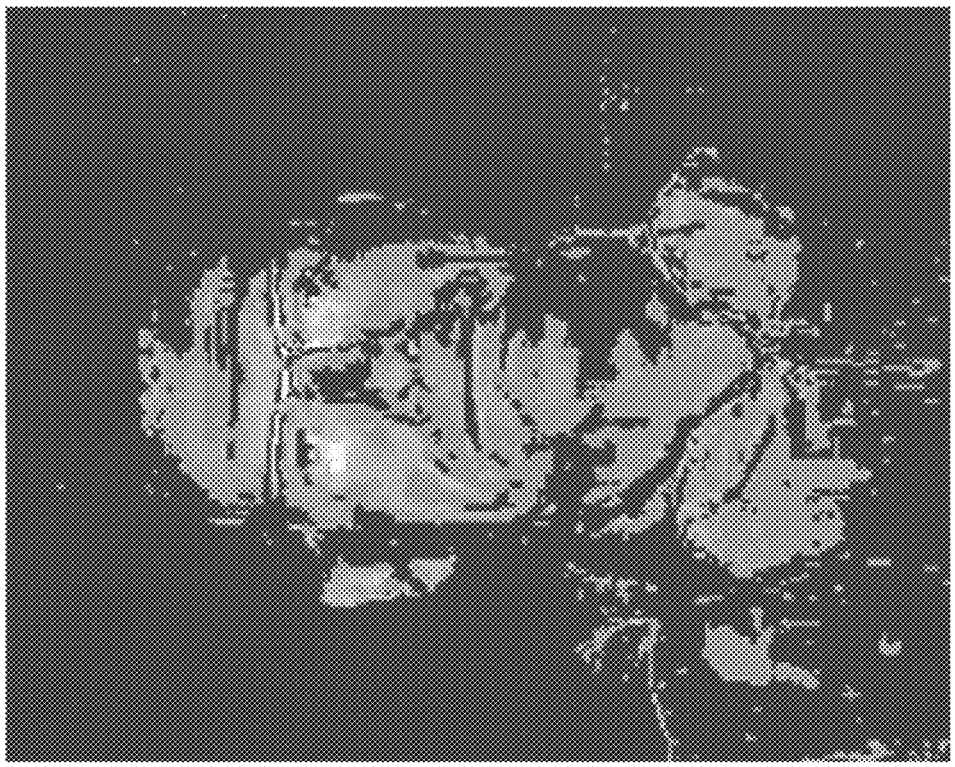
FIG. 25 is an image showing differences in illumination of a face caused by illumination from the screen of a mobile device.

In one use case, the code is used to control on/off illumination with white light. This is detected on the user's face by measuring the luminance characteristics of the recorded imagery of the face, which in most coding schemes are represented with greater spatial resolution than the color information. An example of the effect of illumination from a device display is shown in FIG. 25, which shows the pixel-wise difference between an image captured when the screen is illuminated (white) and that captured when the screen is dark. Pixels that are bright in the difference image derive from a location which gets brighter in the illumination on frame as compared to the illumination off frame. The illumination provided by a mobile phone screen or laptop computer screen on a user's face when held at a natural distance is about 40 lux. In lower levels of ambient light, the display screen of the device is flashed on and off with white, i.e., with substantially all the screen pixels set to white, and the front-facing camera records the consequent change in reflected luminance.

In ambient daylight (not direct sunlight), illumination levels of 10,000 lux can be reached. The change in illumination attributable to the controlled illumination may therefore fall as low as 0.4% of the ambient. For a digital camera having an 8-bit brightness resolution, the change is equivalent to one bit. However, cameras have automatic exposure that, at least for most mobile device cameras, adjusts exposure according to overall scene brightness. This tends to compress and shift the dynamic range, so that the change falls below the brightness resolution of the camera. In many conditions of face imaging, there is strong backlighting from the sky or ceiling lights. To address this, device cameras in which automatic exposure can be overridden, are forced into a condition of over-exposure with respect to the overall scene brightness, such as by using a spot focus and exposure on the center of the imaged face. This removes effects of backlighting. The exposure can then be increased further.

In bright light, such as in natural light conditions, it becomes highly desirable to deliver the modulated illumination during the capture period using a source of illumination brighter than the device screen. Thus when the detected ambient light conditions are above a predetermined threshold level, a signal is sent to the user device instructing the user to use a camera that has an associated illuminator or flash, such as the rear-facing camera on a mobile telephone or tablet. In order to determine when the user is holding the mobile device in a position suitable for rear-facing camera capture, the motion of the device is tracked using its onboard accelerometer and gyroscope, if these are present. This method obviates the need to use detection of the location of the user's face as doing this remotely may have too much latency, and using the front-facing display screen to provide feedback is not possible when the rear camera is being used. Assuming that the user views the front screen of the mobile device with the device screen perpendicular to their line of sight, and that the rear-facing camera on the device is in the same plane as the screen, it can be concluded that if the device is rotated 180 degrees around any axis lying in the plane of the screen of the device in its initial position (i.e., the XY plane), the final position of the device will point the rear-facing camera at the user's face. Therefore the information provided by the gyroscopes in the device regarding the angular velocity may be integrated to determine the position of the device and may be compared with the information from the accelerometers to eliminate any integration or drift error. The system may determine from a sudden change in the angular position of the device in the XY plane at a time when a verification action is expected that a rotation to use the rear camera has begun, and when the rotation in the XY plane has reached 180 degrees, to a tolerance of around 15 degrees, it may be concluded that the rear camera is pointing at the face of the person and if the angular velocity is below a threshold it may be concluded that the user motion has effectively ceased. In this circumstance the system may be considered ready to capture an image of the user, and this can be signalled to the user by means of an audible and/or vibration feedback signal, inviting the user to keep the device and their head reasonably still. In the absence of the visibility of a screen to provide visual feedback of the completion of the image capture, a further audible and/or vibration feedback signal may be given to signal the completion of the verification and inviting the user to turn the device back to the original usage position.

In techniques involving use of color, the code is used to control illumination with switched sequences of monochromatic colors while a forward-facing camera captures video of the user's face. This involves displaying on the screen of the user's client device, a sequence of blocks of uniform color having a size that is large enough to illuminate the user's face and produce a measurable reflection from their skin. The relative change in luminance in one color band compared to ambient light may be greater than when white light illumination is used. The code is detected from changes in tonal balance rather than from luminance. Since the screen brightness changes viewed by the user are reduced, this approach has the advantage of reducing optical discomfort that might be caused by white light modulation.

To further reduce the risk of user discomfort, illumination by a smoothly changing sequence of monochromatic screen colors may be used. As with the switched color sequence method, a forward-facing camera is needed to capture the user's face. The screen changes from one color to another by means of a spatially homogeneous transition such as a fade, or by apparent movement on the screen of a band or ribbon of color flowing across the screen in a horizontal, vertical, or diagonal direction, or a combination of these in sequence. The change may be textured to produce a visually pleasing and interesting effect as it appears to pass across the screen.

The colored illumination is modulated at a rate high enough to ensure that, in an attempt at impersonation, the computing power available locally on the user's client device is insufficient to synthesize a suitably tinged image from a recorded or synthesized base image. This also makes it significantly harder for a computerized fraud to insert pictures using reasonably available network resources. Such change rates also mean that there is negligible movement of the head during the process. The minimum rate is 1-3 per second; the maximum feasible rate may be limited by the speed of the user's camera, i.e., about 12 per second for typical consumer device cameras in 2012. The speed must be such as not to cause visual discomfort. The sequence of colors may be controlled one by one in real time by the Agent, or may be represented by a numeric code. The sequence, or the code used, is sent by the Agent at the time of validation, and is changed in a pseudo-random or otherwise hard-to-predict manner each time a validation takes place. The slight cast of color reflected from the consumer's facial skin or cornea is extracted by the Agent by comparing the image of the subject's face illuminated by the colored square with an image taken and stored immediately before that colored square was presented. Due to the short times involved, changes in subject position or illumination arising from other causes will be slight, so that differences between the two images will result from the changes in the controlled illumination. This is used to determine the colour with which the subject has been illuminated, checking that it is the same as that of the coloured square, taking into account the fact that the reflected colour has been modified by skin tones. Furthermore, the system examines the spatial distribution of the illumination attributable to the coloured square, and confirms that a higher reflective signal corresponds to areas of high reflectivity such as the cornea, spectacles, and the tip of the nose, and an attenuated signal corresponds to areas of low reflectivity such as the lips or eyebrows. A sequence of reflected colour changes corresponding to that transmitted by the Agent serves to preclude a spoofing attempt using recorded imagery. A correct spatial distribution of colour reflectivity from the face serves to distinguish the received image from a normal still photograph, which has a different distribution of reflectivity, typically more uniform in distribution than that of a face.

Providing that the colors used to illuminate the face change fast enough, it is impractical for an attacker to tint a recorded photograph or recording with the required spatial distribution in the short time available.

International recommendations set the upper limit for visual impulses to avoid photosensitive epilepsy at three changes per second, and this limits the rate at which the illumination can safely be changed for such users. Users also have a limited patience for motionlessly submitting to the authentication process, of the order of several seconds. The total number of bits available is therefore very limited, and there are none available for the normal dotting sequence used for clock extraction to demodulate packets of data. Similarly, clock-rich coding schemes such as Manchester decoding would reduce the amount of code data by half, reducing the overall code space to a level which would not adequately secure the system.

The devices used to capture the individual's image are positioned in very different ways: a PC webcam might be at eye level distant 1 m from the user, whereas a mobile phone would be held near the chest at only 40 cm distance. These differences in viewpoint have large effects both on the pose captured and on the visual perspective of the captured image. They also change the way that the controlled lighting illuminates the user's face. This is solved by capturing separate reference images from each of the different device types intended to be used and analysing the imagery according to the device type used.

The number of bits that are encoded into the varying illumination in a given period of time may be increased without increasing the number of transitions in brightness. Such methods facilitate compliance with the international standards referred to above. The methods include controlled jitter in the timing of the bit transitions. For example, if the bits last for 300 ms, and the period of illumination is 3.0 seconds, then the normally presumed maximum number of bits that can be encoded in the illumination is 10. However, if the time period is divided into slides of duration 75 ms for example, then a bit may last 150 ms, 225 ms, 300 ms, 375 ms, or 450 ms, which provides a basis for increasing the number of encoded bits without exceeding the 3 per second limit.

Another method of increasing the bits per transition exploits multi-level luminance encoding, in which the brightness level of the illumination encodes information. For example, with three levels of illumination, e.g., bright, medium and dark, and a detector capable of distinguishing these levels, the amount of information conveyed in the above example increases from 10 to 12 bits. Multi-level chrominance encoding may also or alternatively be used, in which the color of the illumination encodes information. For example, if each of the three primary colors is used to illuminate the face, the amount of information increases by 58% compared to the use of two colors.

The facial imagery captured during the period of code-controlled illumination is transmitted to the Agent or to a central network service center without any processing on the user device except that, if network bandwidth is limited, the imagery may be compressed at the user device before transmission.

At the service center, the pattern of illumination on the user's face is extracted and analyzed to deduce the code used to control it. The extracted code is then compared to the transmitted code, and agreement between the two codes indicates that the imagery received at the network center is not a digital recording. Alternatively, in particular if the video is captured in conditions characterized by low proportionate change in overall illumination caused by the controlled illumination resulting in an increased frame error rate, the imagery may be analyzed to determine a probability that the illumination code used is the same as the transmitted code. Then if the probability is high enough, for example exceeding a predetermined threshold, it is concluded that the received imagery is not a digital recording.

Eye-blink dynamics provide another means of authenticating facial imagery. The user-facing camera on the user's device is able to resolve the user's eyes in considerable detail. This enables the use of blink dynamics i.e., determining a kinematic characteristic of the user's blinking behavior based on a detailed analysis of the dynamics of the eyelid as it blinks. Key detected characteristics that may be compared to the individual's profile include the speed at which the upper eyelid descends and ascends, the movement of the folds of skin of the upper eyelid as it descends, difference in synchronization of movement between the two upper eyelids, the dwell time of the eyelid in a closed position before it starts to open again, the degree of movement of the lower eyelid, and the creasing of the skin around the eyes as the blink progresses. Such characteristics may be most useful as a supplementary biometric characteristic during the verification process. Methods involving blink dynamics may serve to counter face-mask based attacks by real persons.

Dental recognition also provides a means of facial authentication. The subject is asked to smile or retract the lips in order to show their teeth. The camera captures the image of their teeth and compares the width, orientation, depth where visible, profile of the visible bottoms (or tops in the case of prognathism) of the teeth and any distinguishing marks such as cracks or metal fillings with that are stored in user's profile.

Communication methods, in which the Agent uses biometric parameters extracted from the real-time data to discover possession of secret knowledge by the individual and its communication to the Agent by biometric methods are exemplified as follows. In one method, a sequence of images is displayed on the screen, one of which is recognizable to or chosen by the user. Images recognizable to the user are determined as part of the enrollment process. The user is asked to blink when a recognized image is displayed. Alternatively, the system may exploit the well-known observation that users blink involuntarily when they see a familiar image appear on the screen of their device. The system recognizes the blink, and validation is achieved if detected blinks occur when recognizable images are displayed.

As part of the deployment of the authentication methods described herein, the SP web site may call an application on the user's device or a plug-in or web app in a browser running on the device that controls one or both of its display screen and flash illuminator based on the incoming code from the SP, and transmit the captured imagery (video and/or still) of the illuminated face back to a remote server. The server performs the authentication tests, and sends its conclusion to the SP.

The disclosed methods can also be used to speed up identify verification of consumers calling company call centers or being called by outbound calls. In such circumstances, consumers are required to undergo an identity verification process to ensure that the company is complying with data protection regulations. This involves a verbal challenge by the call-center agent requesting a piece of personal information and a response by the consumer, which takes about 45 seconds on average. Not only do the techniques described here accelerate the verification, they also obviate the need for the consumer to reveal personal information over the phone.

In this case, the process may be undertaken using a mobile phone in the user's possession. The call center agent is able to start the app running the process remotely by using the Push Notification function of the smartphone iOS, Android and other operating systems. The call-centre agent takes the call from the user, verifies the claimed identity of the user, checks if there is a device registered, asks the consumer whether they are willing to proceed, remotely launches the application on the consumer's device, face validates the identity of the consumer, and proceeds with the call. This may reduce the identity confirmation time from 45 seconds to about 15 seconds.

The applications of the methods described herein that have been discussed so far are primarily directed to authentication of the identity and/or pseudonym of individual online users. In a related application, the methods are applied to distinguish access requests by human users from those of automated bots, crawlers, and other access methods that attempt to simulate human users. Malicious access attacks of this nature commonly seek to gain access to the unauthenticated services of an SP, such as obtaining an air travel quote for unauthorized resale or accessing web-based email to create large numbers of email accounts with which to generate spam. Popular means of combating this rely on a form of the Turing test, in which a challenge is issued to the user to elicit a response that would be difficult or expensive for a machine to replicate. Services such as reCAPTCHA™, which ask a user to recognize non-standard, relatively illegible text, adopt this approach. Since it is troublesome for users, it is widely disliked. The methods disclosed herein provide an effective alternative means to effect such authentication, since the process of recognizing the face of an individual is a subset of the more general process of recognizing a face as being that of a human being. Systems for recognizing faces, such as those in the open source software OpenCV may be combined with the methods disclosed herein, including those that evaluate the light reflected from the face at the time of authentication, to enable reliable authentication that the face presented is that of a human being who is present at the time of the attempted online access. This serves to eliminate the need for unpopular Turing test challenges.

Embodiments of the systems for remote, real-time pseudonym verification and identity validation of online users described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, reflective displays such as E Ink, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, time-based and media data such as video data and audio data, still image data, or audio data, metadata, media annotations, and other data. The identity of the computer system may not be readily available to users and/or the client devices in data communication with the system. The system may be embodied in one or more servers located at one or more remote locations. The functions performed by the computer system may be implemented as a cloud service.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Database information, facial image and voice information, and other online user identification information may be stored on and input from magnetic, optical, or solid state drives, which may include an array of local or network attached disks.

A system such as described herein may be implemented in software, hardware or firmware, or a combination of the three. The various elements of the system, either individually or in combination may be implemented as one or more computer program products in which computer program instructions are stored on a computer readable medium for execution by a computer, or transferred to a computer system via a connected local area or wide area network. Computer program instructions may also be sent via communication media, such as carrier signals and the like. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of authenticating a presence of an online user, the method comprising:
    sending control signals from a server to a user device, wherein the user device includes:
        a source of illumination;
        a camera capable of capturing video imagery of the online user; and
        wherein the user device is capable of:
            receiving the control signals;
            modulating the source of illumination in accordance with the received control signals; and
            transmitting captured video imagery of the online user to the server;
    receiving at the server video imagery transmitted by the user device, wherein the video imagery is captured by the camera while the source of illumination is being modulated in accordance with the control signals during authentication of the online user;
    in a first analyzing step, analyzing the received video imagery to detect frames that show changes in reflected illumination in temporal correspondence with the control signals;
    in a second analyzing step, determining a spatial arrangement of the brightness changes in reflected illumination in the detected frames and determining a degree of consistency of the spatial arrangement of the brightness changes in reflected illumination with a spatial arrangement of brightness changes that would be expected from a three-dimensional shape comprising major facial features of a human face present during authentication;

using results of the first analyzing step to determine a first likelihood that the received video imagery was captured from an object viewed by the camera in real time, wherein the determination of the first likelihood is independent of video imagery captured during enrollment of the online user;

using results of the second analyzing step to determine a second likelihood that the received video imagery captured a human face present during authentication, wherein determination of the second likelihood is independent of movement of the online user in response to the modulation of the illumination; and generating an authentication response based on the first likelihood and the second likelihood.

2. The method of claim 1, further comprising comparing the received video imagery with stored facial image data and identifying an individual corresponding to the received video imagery.

3. The method of claim 1, wherein the control signals cause the source of illumination to be modulated at a rate of at least once per second.

4. The method of claim 1, wherein the control signals cause the source of illumination to be modulated at a rate that exceeds a rate at which the user device is able to generate a correspondingly illuminated image of the online user from a stored image.

5. The method of claim 1, wherein generating the authentication response involves determining a spatial pattern of reflectivity from the received video imagery.

6. The method of claim 1, wherein illumination provided by the source of illumination includes infrared.

7. The method of claim 1, wherein at least one of the analyzing steps includes analyzing luminance values of pixels of frames of the received video imagery.

8. The method of claim 1, wherein the camera of the user device is front-facing, and wherein modulating the source of illumination comprises changing a displayed color of substantially all pixels of a display of the user device.

9. The method of claim 8, wherein the displayed color is selected to reduce optical discomfort of the user.

10. The method of claim 1, wherein the camera of the user device is front-facing, and wherein modulating the source of illumination comprises smoothly changing on a display of the user device at least one of a spatially homogenous and a spatially patterned sequence of colors.

11. The method of claim 1, wherein the camera and the source of illumination are rear-facing and the captured video imagery of the online user is captured when the rear-facing camera is pointing at the user.

12. The method of claim 11, wherein the user device further includes an accelerometer and a gyroscope, and the user device determines when a position of the user device is suitable for rear-facing camera capture of the user by tracking motion of the user device using data from at least one of the accelerometer and the gyroscope.

13. The method of claim 12 further comprising issuing a signal to the user when the position of the user device is suitable for rear-facing camera capture of the user.

14. The method of claim 1, further comprising:
generating the control signals according to a first numeric code;

extracting a pattern of illumination from the received video imagery;

deducing a second numeric code from the extracted pattern of illumination; and generating a positive authentication response if a quality of match between the first numeric code and the second numeric code exceeds a quality threshold.

15. The method of claim 1, wherein an automatic exposure setting of the camera is overridden in order to improve imagery captured of the user's face.

16. A computer system comprising:
a CPU;
a memory storing instructions for execution by the CPU, wherein execution of the instructions on the CPU implements a method of authenticating a presence of an online user, the method comprising:
sending control signals from the computer system to a user device, wherein the user device includes:
a source of illumination;
a camera capable of capturing video imagery of the online user; and
wherein the user device is capable of:
receiving the control signals;
modulating the source of illumination in accordance with the received control signals; and
transmitting captured video imagery of the online user to the computer system;
receiving at the computer system video imagery transmitted by the user device, wherein the video imagery is captured by the camera while the source of illumination is being modulated in accordance with the control signals during authentication of the online user;
in a first analyzing step, analyzing the received video imagery to detect frames that show changes in reflected illumination in temporal correspondence with the control signals;
in a second analyzing step, determining a spatial arrangement of the brightness changes in reflected illumination in the detected frames and determining a degree of consistency of the spatial arrangement of the brightness changes in reflected illumination with a spatial arrangement of brightness changes that would be expected from a three-dimensional shape comprising major facial features of a human face present during authentication;
using results of the first analyzing step to determine a first likelihood that the received video imagery was captured from an object viewed by the camera in real time, wherein the determination of the first likelihood is independent of video imagery captured during enrollment of the online user;
using results of the second analyzing step to determine a second likelihood that the received video imagery captured a human face present at the time of authentication, wherein determination of the second likelihood is independent of movement of the online user in response to the modulation of the illumination; and
generating an authentication response based on the first likelihood and the second likelihood.

17. A computer program product comprising:
non-transitory computer-readable storage with computer program instructions encoded thereon, wherein the computer program instructions, when processed by a computer, instruct the computer to perform a method of authenticating a presence of an online user, the method comprising:
sending control signals from the computer to a user device, wherein the user device includes:

a source of illumination;
a camera capable of capturing video imagery of the online user; and
wherein the user device is capable of:
receiving the control signals;
modulating the source of illumination in accordance with the received control signals; and
transmitting captured video imagery of the online user to the computer;
receiving at the computer video imagery transmitted by the user device, wherein the video imagery is captured by the camera while the source of illumination is being modulated in accordance with the control signals during authentication of the online user;
in a first analyzing step, analyzing the received video imagery to detect frames that show changes in reflected illumination in temporal correspondence with the control signals;
in a second analyzing step, determining a spatial arrangement of the brightness changes in reflected illumination in the detected frames and determining a degree of consistency of the spatial arrangement of the brightness changes in reflected illumination with a spatial arrangement of brightness changes that would be expected from a three-dimensional shape comprising major facial features of a human face present during authentication;
using results of the first analyzing step to determine a first likelihood that the received video imagery was captured from an object viewed by the camera in real time, wherein the determination of the first likelihood is independent of video imagery captured during enrollment of the online user;
using results of the second analyzing step to determine a second likelihood that the received video imagery captured a live human face, wherein determination of the second likelihood is independent of movement of the online user in response to the modulation of the illumination; and
generating an authentication response based on the first likelihood and the second likelihood.

18. The method of claim 1, wherein at least one of the analyzing steps includes analyzing luminance values of pixels in a given color channel.

19. The method of claim 1, further comprising:
generating the control signals according to a numeric code;
extracting a pattern of illumination from the received video imagery; and
generating a positive authentication response if a quality of match between a pattern of illumination corresponding to the numeric code and the extracted pattern of illumination exceeds a quality threshold.

20. The method of claim 1, wherein modulating the source of illumination by the control signals includes causing the source of illumination to assume multiple brightness levels.

21. The method of claim 1, wherein modulating the source of illumination by the control signals includes causing the source of illumination to assume multiple chrominance levels.

22. The method of claim 2, wherein the stored facial image data used in the comparison with the received video imagery includes stored facial image data imagery captured from a viewpoint and distance similar to that from which the received video imagery was captured by the user device.

23. The method of claim 2, wherein the stored facial image data includes imagery captured from original identity documents of the individual.

24. The method of claim 1, wherein the authentication response is further based on whether a pseudonym presented by the online user corresponds to a stored pseudonym previously associated with stored facial imagery matching the received video imagery.

25. The method of claim 1, wherein the authentication method is remotely launched by a recipient of a call from the online user.

26. The method of claim 1, wherein the control signals are algorithmically generated.

27. The method of claim 1, wherein determining the degree of consistency of the spatial arrangement of the brightness changes in reflected illumination with an expected spatial arrangement of brightness changes that would be expected from a three-dimensional shape comprising major facial features of a human face present during authentication includes a comparison with an expected spatial arrangement of brightness changes that would be expected in video imagery captured from a reproduction of a human face.

28. The method of claim 27, wherein the reproduction of a human face is a photograph.

29. A method of authenticating a presence of an online user, the method comprising:
sending control signals from a server to a user device, wherein the user device includes:
a source of illumination;
a camera capable of capturing video imagery of the online user; and
wherein the user device is capable of:
receiving the control signals;
modulating the source of illumination in accordance with the received control signals; and
transmitting captured video imagery of the online user to the server;
receiving at the server video imagery transmitted by the user device, wherein the video imagery is captured by the camera while the source of illumination is being modulated in accordance with the control signals during authentication of the online user;
identifying frames of the received video imagery that show evidence of illumination changes attributable to the modulations of the source of illumination in accordance with the received control signals;
analyzing a spatial arrangement across the identified frames of brightness changes attributable to the modulation of the source of illumination in accordance with the received control signals to determine a degree of consistency between the spatial distribution arrangement of the brightness changes and an expected spatial arrangement of changes in brightness attributable to the modulation of the source of illumination that would be expected in video imagery captured from a three-dimensional shape comprising major facial features of a human face present during authentication; and
generating an authentication response based on the determined degree of consistency, wherein the authentication response is independent of video imagery captured during enrollment of the online user and is independent of movement of the online user in response to the modulation of the illumination.

30. The method of claim 29, wherein generating the authentication response is further based on analyzing a spatial arrangement across the identified frames of brightness changes attributable to the modulation of the source of illumination in accordance with the received control signals to determine a degree of consistency between the spatial arrangement of the brightness changes and an expected spatial arrangement of changes in brightness attributable to the modulation of the source of illumination that would be expected in video imagery captured from a reproduction of a human face.

* * * * *